US011645204B2

(12) United States Patent
Chen et al.

(10) Patent No.: US 11,645,204 B2
(45) Date of Patent: May 9, 2023

(54) MANAGING CACHE REPLACEMENT IN A STORAGE CACHE BASED ON INPUT-OUTPUT ACCESS TYPES OF DATA STORED IN THE STORAGE CACHE

(71) Applicant: Dell Products L.P., Round Rock, TX (US)

(72) Inventors: Chi Chen, Chengdu (CN); Huijuan Fan, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 17/493,973

(22) Filed: Oct. 5, 2021

(65) Prior Publication Data

US 2023/0079746 A1 Mar. 16, 2023

(30) Foreign Application Priority Data

Sep. 10, 2021 (CN) .......................... 202111065680.1

(51) Int. Cl.
*G06F 12/0802* (2016.01)
(52) U.S. Cl.
CPC ...... *G06F 12/0802* (2013.01); *G06F 2212/60* (2013.01)
(58) Field of Classification Search
CPC .................. G06F 12/0802; G06F 2212/60
USPC ...................................... 711/118
See application file for complete search history.

(56) References Cited

U.S. PATENT DOCUMENTS

| 2013/0185475 | A1* | 7/2013 | Talagala | G06F 12/0866 711/102 |
| 2018/0285282 | A1* | 10/2018 | Jakowski | G06F 12/0811 |
| 2019/0377674 | A1* | 12/2019 | Perlmutter | G06F 12/0246 |

OTHER PUBLICATIONS

J. Bak et al., "Random vs. Sequential Explained," https://blog.open-e.com/random-vs-sequential-explained/, Accessed Aug. 3, 2021, 5 pages.
C. Min et al., "SFS: Random Write Considered Harmful in Solid State Drives," FAST '12: 10th USENIX Conference on File and Storage Technologies, Feb. 15, 17, 2012, pp. 139-154.

(Continued)

*Primary Examiner* — Edward J Dudek, Jr.
*Assistant Examiner* — Sidney Li
(74) *Attorney, Agent, or Firm* — Ryan, Mason & Lewis, LLP

(57) ABSTRACT

An apparatus comprises a processing device configured to monitor a storage cache storing a plurality of cache pages to determine whether the storage cache reaches one or more designated conditions and to determine cache replacement scores for at least a subset of the cache pages, the cache replacement scores being determined based at least in part on input-output access types for data stored in the cache pages. The processing device is also configured to select, responsive to determining that the storage cache has reached at least one of the one or more designated conditions, at least one of the cache pages to move from the storage cache to a storage device based at least in part on the determined cache replacement scores. The processing device is further configured to move the selected at least one of the plurality of cache pages from the storage cache to the storage device.

20 Claims, 8 Drawing Sheets

(56) References Cited

OTHER PUBLICATIONS

Condusiv, "I/Os Are Not Created Equal—Random I/O versus Sequential I/O," https://condusiv.com/sequential-io-always-outperforms-random-io-on-hard-disk-drives-or-ssds/, Mar. 17, 2021, 5 pages.
NVM Express, NVM Express, Revision 1.3, NVM Express, May 1, 2017, 282 pages.

* cited by examiner

| $p_1$ | $p_2$ | $p_3$ | ... | $p_N$ |

CACHE PAGES LIST
400

| $C_1$ | $C_2$ | $C_3$ | ... | $C_N$ |

ACCESS FREQUENCY LIST
410

| $D_{r1}$ | $D_{r2}$ | $D_{r3}$ | ... | $D_{rN}$ |

RANDOM-ACCESS RATIO LIST
420

FIG. 4

| PAGE | 0 | 1 | 2 | 3 | 4 | 5 | 6 | 7 | 8 | 9 |
|---|---|---|---|---|---|---|---|---|---|---|
| ACCESS FREQUENCY $c$ | 10 | 5 | 7 | 6 | 3 | 5 | 4 | 2 | 2 | 5 |
| RANDOM-ACCESS $D$ | 2 | 3 | 4 | 2 | 3 | 1 | 1 | 0 | 1 | 1 |
| $R_{ci}$ | 0.204 | 0.102 | 0.142 | 0.122 | 0.061 | 0.102 | 0.081 | 0.040 | 0.040 | 0.102 |
| $R_{ri}$ | 0.111 | 0.166 | 0.222 | 0.111 | 0.166 | 0.055 | 0.055 | 0 | 0.055 | 0.055 |
| $s$ | 0.157 | 0.134 | 0.182 | 0.116 | 0.113 | 0.078 | 0.068 | 0.020 | 0.048 | 0.078 |

FIG. 6

MANAGING CACHE REPLACEMENT IN A STORAGE CACHE BASED ON INPUT-OUTPUT ACCESS TYPES OF DATA STORED IN THE STORAGE CACHE

RELATED APPLICATION

The present application claims priority to Chinese Patent Application No. 202111065680.1, filed on Sep. 10, 2021 and entitled "Managing Cache Replacement Based on Input-Output Access Types of Data," which is incorporated by reference herein in its entirety.

FIELD

The field relates generally to information processing, and more particularly to storage in information processing systems.

BACKGROUND

Information processing systems may provision storage resources of various storage systems for use by different users. The different users, for example, may have associated storage pools each comprising storage resources provisioned from one or more storage systems. Each storage system may therefore run multiple different workloads. The different workloads may be associated with a same user, or different users. Each of the workloads may have its own unique demand or storage profile, and the various workloads running on a given storage system share various resources of the given storage system.

SUMMARY

Illustrative embodiments of the present disclosure provide techniques for managing cache replacement in storage cache based on input-output access types of data stored in the storage cache.

In one embodiment, an apparatus comprises at least one processing device comprising a processor coupled to a memory. The at least one processing device is configured to perform the steps of monitoring a storage cache storing a plurality of cache pages to determine whether the storage cache reaches one or more designated conditions and determining cache replacement scores for at least a subset of the plurality of cache pages, the cache replacement scores being determined based at least in part on input-output access types for data stored in the plurality of cache pages. The at least one processing device is also configured to perform the step of selecting, responsive to determining that the storage cache has reached at least one of the one or more designated conditions, at least one of the plurality of cache pages to move from the storage cache to a storage device based at least in part on the determined cache replacement scores. The at least one processing device is further configured to perform the step of moving the selected at least one of the plurality of cache pages from the storage cache to the storage device.

These and other illustrative embodiments include, without limitation, methods, apparatus, networks, systems and processor-readable storage media.

BRIEF DESCRIPTION OF THE DRAWINGS

FIG. 4 shows a cache pages list and corresponding access frequency and random access ratio lists in an illustrative embodiment.

FIG. 6 shows a table of various parameters computed for a set of cache pages that may be utilized in a cache replacement algorithm that takes into account data access type in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
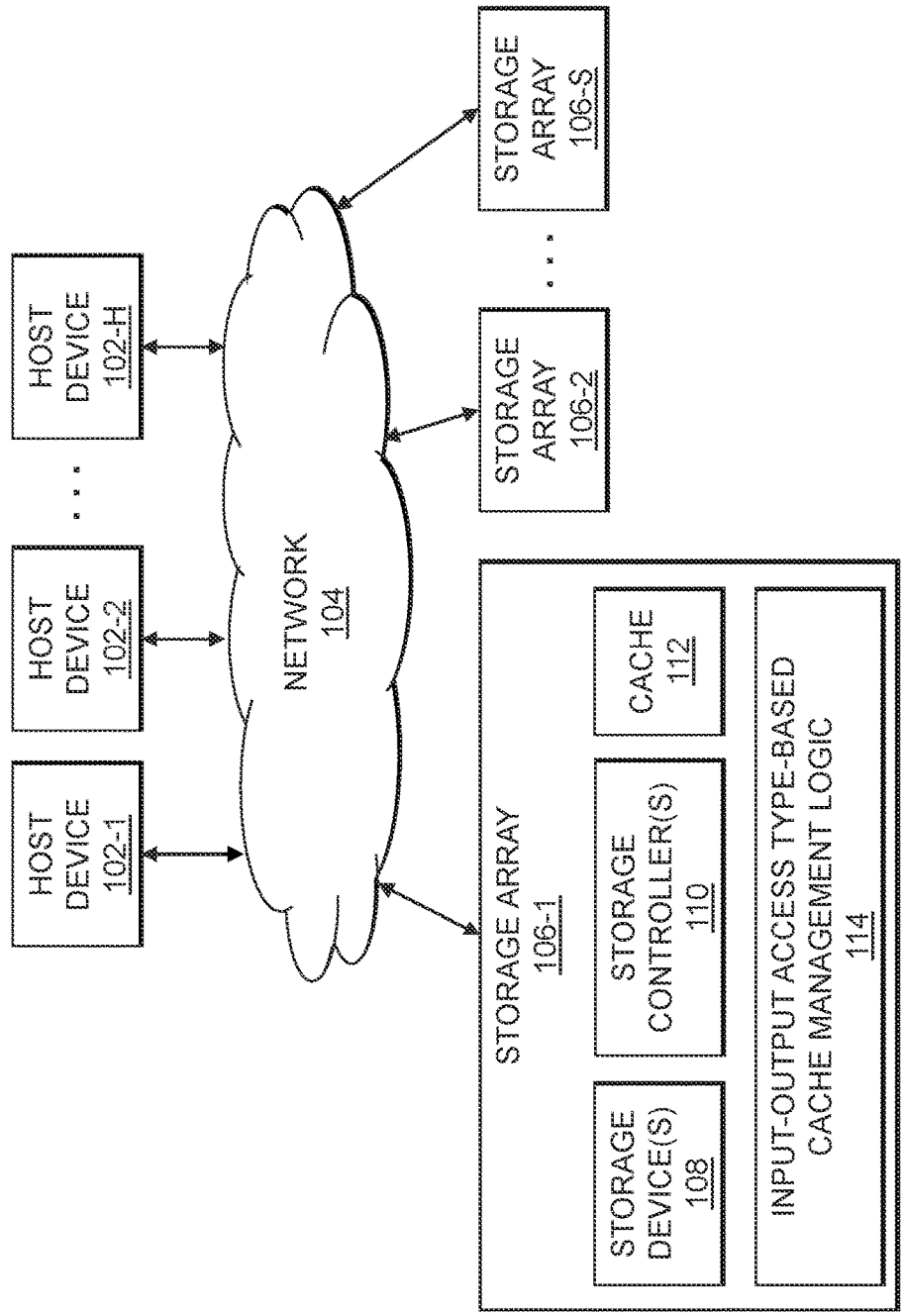
FIG. 1 is a block diagram of an information processing system configured for managing cache replacement in a storage cache based on input-output access types of data stored in the storage cache in an illustrative embodiment.

FIG. 1 shows an information processing system 100 configured in accordance with an illustrative embodiment to provide functionality for managing cache replacement in a storage cache based on input-output access types of data stored in the storage cache. The information processing system 100 comprises one or more host devices 102-1, 102-2, . . . 102-H (collectively, host devices 102) that communicate over a network 104 with one or more storage arrays 106-1, 106-2, . . . 106-S (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage array 106-1 further comprises a storage cache 112 and implements IO access type-based cache management logic 114. The IO access type-based cache management logic 114 is used to manage the cache 112 (e.g., data stored therein). For example, the IO access type-based cache management logic 114 may implement a cache replacement algorithm that takes into account the access type (e.g., sequential access vs. random access) of the data stored in cache pages of the cache 112. The IO access type-based cache management logic 114 can therefore keep cache pages in the cache 112 longer when such cache pages store more random-access data than other cache pages storing less random-access data. In this way, "random-access" data is preferentially kept in the cache 112 rather than being destaged to the storage devices 108. This can improve IO performance of the storage devices 108, and can also increase the lifespan of the storage devices 108 (e.g., as random-access write operations may cause fragmentation and additional erasure cycles on the storage devices 108).

At least portions of the functionality of the IO access type-based cache management logic 114 may be implemented at least in part in the form of software that is stored in memory and executed by a processor.

Although shown as being implemented internal to the storage array 106-1 in the FIG. 1 embodiment, it should be appreciated that the cache 112 and/or the IO access type-based cache management logic 114 may be implemented external to the storage array 106-1. For example, the cache 112 and/or the IO access type-based cache management logic 114 may be implemented at least in part internal to one or more of the host devices 102, one or more other ones of the storage arrays 106-2 through 106-S. The cache 112 and/or IO access type-based cache management logic 114 may also or alternatively be implemented at least in part internal to the storage controllers 110 of the storage array 106-1.

The host devices 102 and the storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and the storage arrays 106 are implemented on the same processing platform. One or more of the storage arrays 106, or portions thereof (e.g., such as cache 112 and IO access type-based cache management logic 114), can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. The cache 112 may represent an example of such a persistent memory. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the host devices 102, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers. Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 7 and 8.

It is to be understood that the particular set of elements shown in FIG. 1 for managing cache replacement in a storage cache based on input-output access types of data stored in the storage cache is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
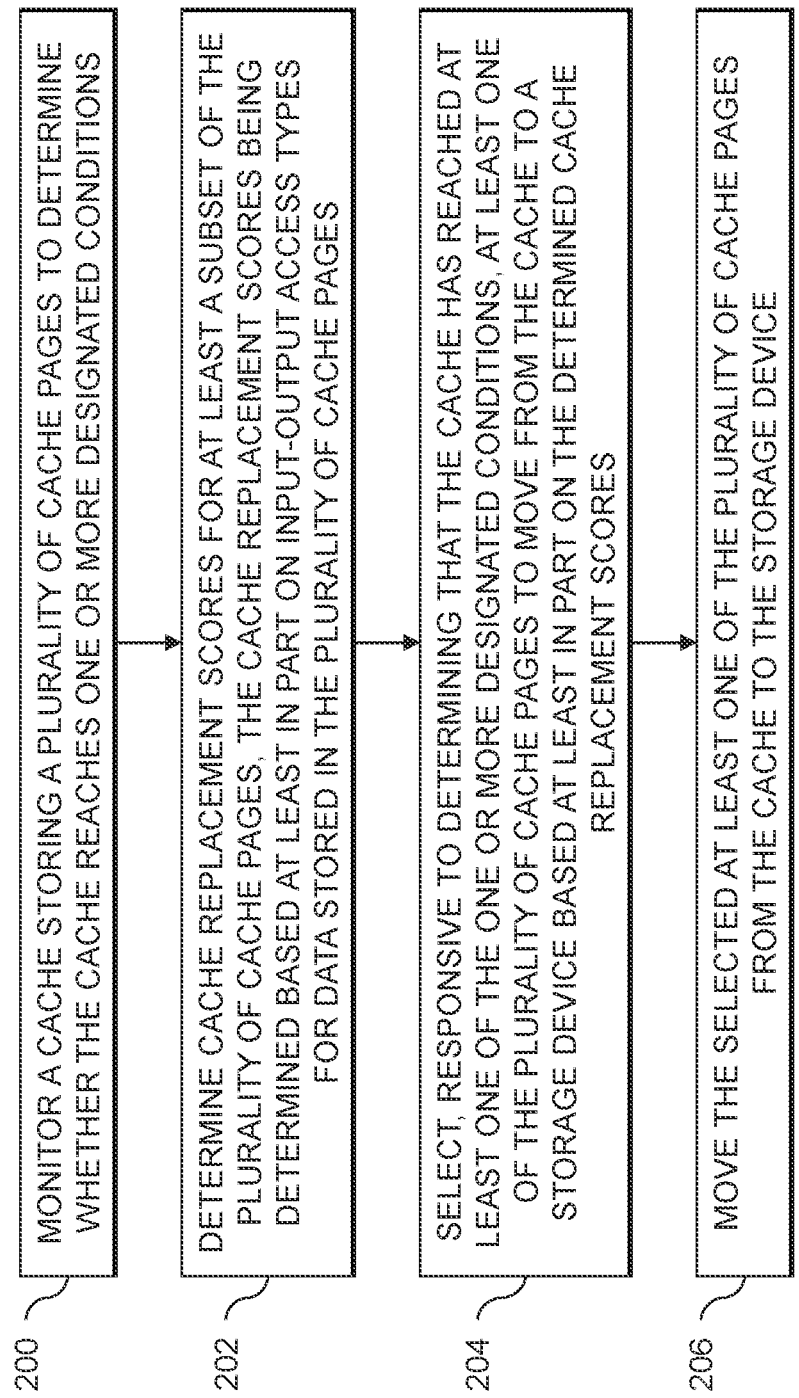
FIG. 2 is a flow diagram of an exemplary process for managing cache replacement in a storage cache based on input-output access types of data stored in the storage cache in an illustrative embodiment.

An exemplary process for managing cache replacement in a storage cache based on input-output access types of data stored in the storage cache will now be described in more detail with reference to the flow diagram of FIG. 2. It is to be understood that this particular process is only an example, and that additional or alternative processes for managing cache replacement in a storage cache based on input-output access types of data stored in the storage cache may be used in other embodiments.

In this embodiment, the process includes steps 200 through 206. These steps are assumed to be performed by the IO access type-based cache management logic 114. The process begins with step 200, monitoring a storage cache (e.g., cache 112) storing a plurality of cache pages to determine whether the storage cache reaches one or more designated conditions. The one or more designated conditions may comprise reaching a cache full condition, storage space in the storage cache falling below a designated space threshold, etc.

In step 202, cache replacement scores are determined for at least a subset of the plurality of cache pages. The cache replacement scores are determined based at least in part on input-output access types for data stored in the plurality of cache pages. At least one of the plurality of cache pages is selected, responsive to determining that the storage cache has reached at least one of the one or more designated conditions, to move from the storage cache to a storage device (e.g., storage devices 108) based at least in part on the determined cache replacement scores in step 204. The selected at least one of the plurality of cache pages is moved from the storage cache to the storage device in step 206.

Determining a given cache replacement score for a given cache page in step 202 may comprise determining a ratio of a count of random-access data stored in the given cache page relative to total random-access data stored in the plurality of cache pages. The given cache replacement score for the given cache page may comprise a weighted combination of a first component score determined based at least in part on the input-output access types for data stored in the given cache page and one or more additional component scores determined based at least in part on one or more additional criteria. The one or more additional criteria may comprise at least one of an access frequency of the given cache page, a most recent access time for the given cache page, and a time at which the given cache page was first stored in the storage cache.

A first weight for the first component score may be adjusted relative to one or more additional weights for the one or more additional criteria, where such adjustment may be based at least in part on monitoring a status of the storage device. Monitoring the status of the storage device may comprise monitoring an expected remaining lifetime of the storage device. The storage device may comprise an SSD, and monitoring the expected remaining lifetime of the storage device may comprise monitoring a number of erasure cycles performed on the SSD. Adjusting the first weight for the first component score relative to the one or more additional weights for the one or more additional criteria may comprise increasing the first weight relative to the one or more additional weights responsive to determining that the expected remaining lifetime of the storage device is below a designated lifetime threshold.

The input-output access types for the data stored in the plurality of cache pages may comprise sequential input-output access and random input-output access. Selecting at least one of the plurality of cache pages to move from the storage cache to a storage device based at least in part on the determined cache replacement scores in step 204 may comprise selecting a given one of the plurality of cache pages having a given cache replacement score indicating a higher amount of random input-output access data stored therein relative to one or more other ones of the plurality of cache pages. Selecting at least one of the plurality of cache pages to move from the storage cache to a storage device based at least in part on the determined cache replacement scores in step 204 may also or alternatively comprise selecting, from among at least two of the plurality of cache pages having a same access frequency, a given one of the at least two cache pages having a given cache replacement score indicating a higher amount of random input-output access data stored therein relative to one or more other ones of the at least two cache pages.

Figure 3:
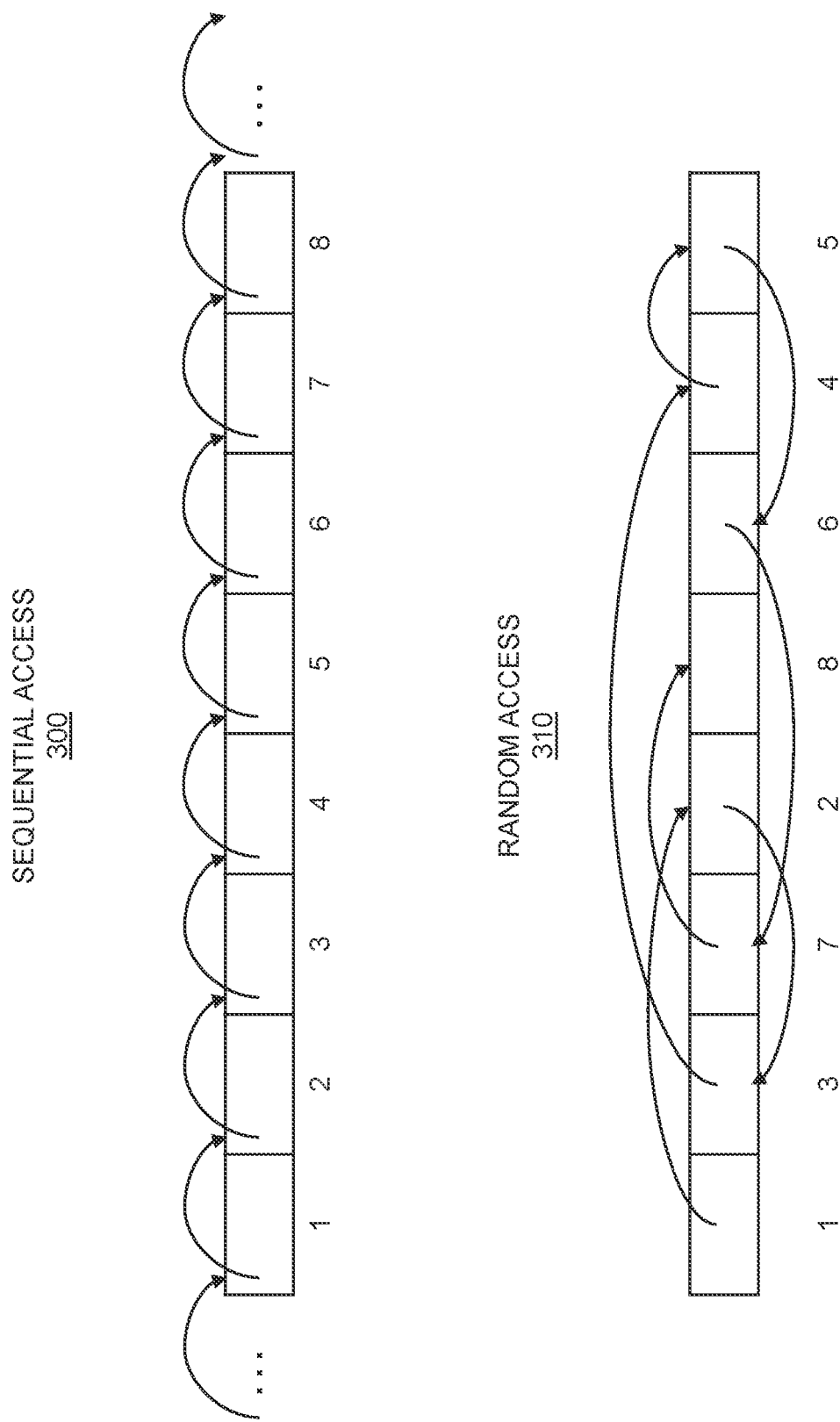
FIG. 3 shows examples of sequential and random access write operations in an illustrative embodiment.

Data IO access to storage systems, such as storage arrays 106, may be classified into different types such as sequential access and random access. A write operation is sequential when its starting storage location (e.g., a logical block address (LBA)) follows directly after the preceding write operation. In contrast, a write operation is random when its starting LBA is not contiguous to the ending of the preceding write operation. FIG. 3 shows examples of sequential write access 300 and random write access 310.

NAND flash memory is the basic building block of SSDs. Read and write operations for SSDs may be performed at the granularity of a page (e.g., 2 KB, 4 KB, etc.) while erase operations are performed at the granularity of a block (e.g., 64 pages, 128 pages, etc.). A whole block must typically be erased before overwriting any page in that block. Certain types of storage devices, such as SSDs, have limited erase cycles. For example, SSDs which utilize single-level cells (SLCs) may have approximately 100,000 erase cycles, and SSDs which utilize multi-level cells (MLCs) may have approximately 10,000 erase cycles. Random writes cause internal fragmentation of SSDs, and thus lead to performance degradation by an order of magnitude. The performance degradation in SSDs caused by fragmentation can last for some time after random writes are stopped, because the random writes can cause data pages in NAND flash blocks to be copied elsewhere and erased. Therefore, random writes can drastically reduce the lifespan of SSDs and other types of storage devices.

With NVMe and SSD technology development, sequential access is very quick and can reach the microsecond (µs) level. Cache memory access, however, can reach the nanosecond (ns) level. Random data writes have a penalty for SSDs and other types of storage devices. Thus, from an overall storage system view, it is beneficial for the cache pages to hold more "random-access" data and to free cache pages that hold "sequential access" data. The data stored in cache pages may be analyzed to determine its random-access statistics (e.g., an amount or ratio of the data stored in each cache page that is part of random-access IO operations). Such statistics may be used so as to keep the cache pages with high random-access request statistics for a longer time and to free cache pages that hold data with high sequential-access request statistics to provide cost savings.

Conventional cache page replacement algorithms (e.g., First In, First Out (FIFO), Least Recently Used (LRU), Least Frequently Used (LFU), etc.) do not consider the side effects of random writes (e.g., degraded performance, internal fragments, etc.) to storage devices such as SSDs. Instead, such conventional cache replacement algorithms typically treat both sequential access data and random-access data the same. A conventional implementation of the LFU cache replacement algorithm, for example, counts how often a cache page is accessed and the cache page(s) that are used least often are discarded first. The conventional implementation of the LFU cache replacement algorithm does not consider random data access circumstances.

Illustrative embodiments provide improved cache replacement algorithms that consider data access type. Cache pages are scored based at least in part on whether cache pages include random-access data or sequential access data. In this way, data which has high random-access frequency gets a higher chance to stage on cache pages, while sequential access data gets a higher chance to be flushed to SSDs or other storage devices from the cache. This can reduce the frequency and number of writes to SSDs or other storage devices. By decreasing the total number of random access writes to SSDs or other storage devices, both performance and lifetime are improved. Further, the techniques are complementary to wear leveling approaches, as the techniques described herein can mitigate SSD or other storage device wear degree since random-access data has a higher chance of staging in the cache which reduces the internal fragmentation.

In some embodiments, a cache replacement algorithm is used which takes into account both access frequency and data access type to generate scores for different cache pages. Cache pages with minimum score(s) are replaced as needed. Using these techniques, cache pages with low access frequency and high data sequential access patterns can be replaced. Further, cache pages with the same access frequency but different data access types can be treated differently. For example, cache pages with a given access frequency which have higher random-access scores can be kept in the cache longer than those cache pages with the given access frequency which have lower random-access scores. This alleviates random IOs harmful to SSD media or other types of storage devices and can expand or lengthen the SSD or other storage devices' lifespan, providing benefits to end-users with storage systems that utilize flash, SSD or other types of storage for which random access IOs can lead to degraded performance and a shorter lifespan.

Various conventional cache replacement algorithms may be modified so as to consider the data access type of cache pages. In the description below, a conventional LFU cache replacement algorithm is modified so as to consider not only cache page request frequency but also the access type for the data stored in the cache pages to generate cache page replacement scores. Cache pages with the minimum cache page replacement scores (e.g., where the cache page replacement scores take into account both cache page request frequency and data access type) are selected for de-staging from the cache to an SSD or other type of storage device. Illustrative embodiments therefore provide improved cache replacement algorithms that increase the efficiency and lifetime of storage devices such as SSDs.

In the description below, N is used to denote the total number of cache pages, and $p_i$ denotes a cache page i, where $1 \leq i \leq N$. $D_{ri}$ denotes the random-access count for cache page i, and $\text{sum}(D_{ri}) = \Sigma_{i=1}^{N} D_{ri}$ denotes the total random-access count of all cache pages. The ratio of random-access on cache page i is denoted as $$R_{ri} = \frac{D_{ri}}{\sum_{i=1}^{N} D_{ri}},$$

where $\text{sum}(R_{ri})=1$. $C_i$ denotes the access count of page i, and the total access count of page i is denoted as $\text{sum}(C_i)=\Sigma_{i=1}^{N} C_i$. The cache page i's access frequency ratio in all cache pages is denoted as $$R_{Ci} = \frac{c_i}{\sum_{i=1}^{N} c_i},$$

and where $\text{sum}(R_{Ci})=1$. The weight of random data for cache page i is denoted as $w_{Ri}$ and the weight of IO access frequency for cache page i is denoted as $w_{Ci}$, where $w_{Ri}+w_{Ci}=1$. The comprehensive score for cache page i is computed as:

$$s_i = w_{Ri} * R_{ri} + w_{Ci} * R_{Ci} = w_{Ri} * \frac{D_{ri}}{D_{ri} + D_{si}} + w_{Ci} * \frac{c_i}{\Sigma_{i=1}^{N} c_i}$$

The comprehensive score $s_i$ combines access count and IO type statistics. When the cache is full, cache pages with the minimum comprehensive score $s_i$ value are replaced such that cache pages with low access and low random access are the best candidates to be de-staged from the cache.

Assume that the total number of cache pages is N, and that the list of cache pages is $P=[p_1, p_2, p_3 \ldots p_N]$, with corresponding array lists for recording each cache page's access count $C=[C_1, C_2, C_3 \ldots C_N]$ and random-access data ratio $D=[D_{r1}, D_{r2}, D_{r3} \ldots D_{rN}]$. FIG. 4 illustrates such a cache pages list 400 and associated access frequency list 410 and random-access data ratio list 420. In order to measure the cache page access frequency and random-access degree, such criteria may first be normalized then weighted to get the comprehensive score for each cache page. The cache page(s) with minimum value may then be determined and selected for replacement when the cache is full.

Figure 5:
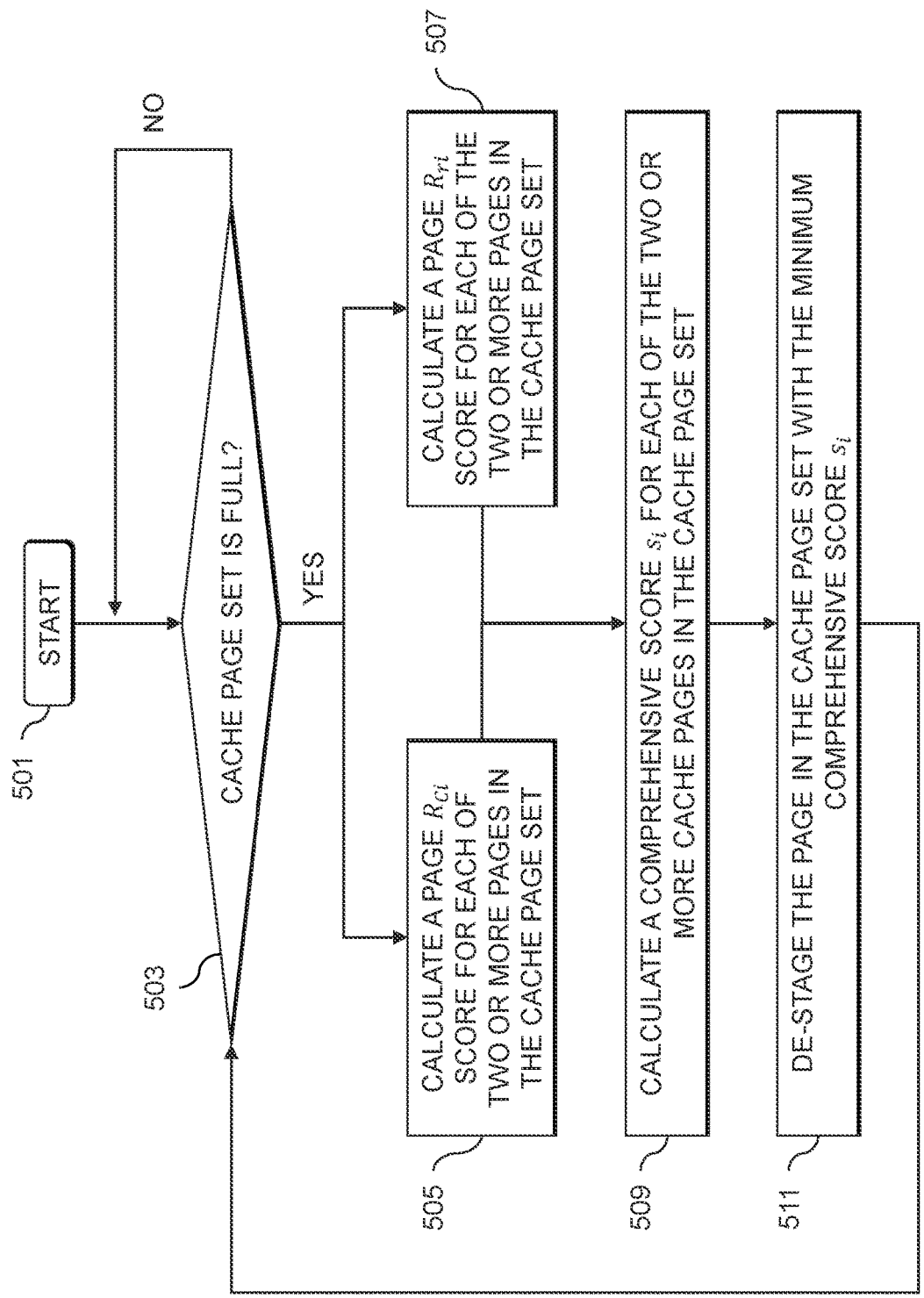
FIG. 5 shows a process flow for a cache replacement algorithm that takes into account data access type in an illustrative embodiment.

FIG. 5 shows a process flow for an improved cache page replacement algorithm that takes into account data access types. The FIG. 5 process flow starts 501, and in step 503 a determination is made as to whether a cache page set is full (e.g., whether a cache is full, such that one or more cache pages stored in the cache need to be evicted and/or replaced with other cache pages). The status of the cache is monitored (e.g., continually, periodically, etc.) until the result of the step 503 determination is yes. When the result of the step 503 determination is yes, the FIG. 5 process flow proceeds to steps 505 and 507.

In step 505, the cache page access count ratio of cache page i, denoted $R_{Ci}$, is calculated for two or more of the cache pages in the cache (e.g., for each cache page in the cache, for at least a subset of the cache pages in the cache, etc.). For a LFU cache replacement algorithm implementation, the cache page i counter list is $C=[C_1, C_2, C_3 \ldots C_N]$. The access frequency ratio for a cache page i is calculated according to Equation (1) below:

$$R_{Ci} = \frac{c_i}{\sum_{i=1}^{N} c_i}$$

In step 507, the ratio of random data access for cache page i, denoted $R_{ri}$, is calculated for the two or more cache pages in the cache. The cache page i random-access data ratio list is $D=[D_{r1}, D_{r2}, D_{r3} \ldots D_{rN}]$. The random-access ratio for a cache page i is calculated according to Equation (2) below:

$$R_{ri} = \frac{D_{ri}}{\sum_{i=1}^{N} D_{ri}}$$

In step 509, the comprehensive score $s_i$ for each of the two or more cache pages in the cache page set is calculated. To do so, the values $R_{Ci}$ and $R_{ri}$ may be combined according to Equation (3) below:

$$s_i = w_{Ri} * R_{ri} + w_{Ci} * R_{Ci} = w_{Ci} * \frac{C_i}{\sum_{i=1}^{N} C_i} + w_{Ri} * \frac{D_{ri}}{\sum_{i=1}^{N} D_{ri}}$$

The scores of the cache pages can be represented as $S=[s_1, s_2, s_3 \ldots s_N]$. $w_{Ri}$ is the weight of random-access for page i, and $w_{Ci}$ is the weight of data access frequency for page i, with $w_{Ri}+w_{Ci}=1$. The particular values of $w_{Ri}$ and $w_{Ci}$ may be tuned as desired for a particular implementation, and may be adjusted over time. For example, as a particular SSD or other storage device is reaching its expected lifespan, the value for $w_{Ri}$ may be increased relative to that of $w_{Ci}$, such that pages with higher random-access ratios are kept in the cache longer even if they have relatively low access frequency counts in order to increase the lifespan of the SSD or other storage device. Various other adjustments may be made. For example, if it is known that a particular SSD or other storage device is scheduled to be replaced (e.g., within some designated threshold period of time), then the value for $w_{Ri}$ may be decreased relative to that of $w_{Ci}$, as there may not be a need to extend the lifespan of that SSD or other storage device. It should be noted, however, that even in such cases it may be desired to keep cache pages with high random-access ratios in the cache for performance reasons.

In step 511, the cache page in the cache page set with the minimum comprehensive score $s_i$ (e.g., $\min[s_1, s_2, s_3 \ldots s_N]$) is de-staged or otherwise evicted or removed from the cache. The cache page with the minimum comprehensive score $s_i$ has the lowest weighted combination of access frequency and random-access ratios, and is thus the best candidate to be de-staged from the cache. While the modified LFU cache replacement algorithm described with respect to FIG. 5 is more complex than a conventional LFU cache replacement algorithm, the modified LFU cache replacement algorithm provides various advantages. Such advantages include finding better cache pages to replace (e.g., for improved performance and lifespan of SSDs or other storage devices), and in handling cases where multiple cache pages may have a same access frequency count (e.g., cache pages with more sequential-access data is selected for replacement over cache pages with less sequential-access data). This provides benefits for SSDs or other storage devices over time, such as in decreasing fragmentation and minimizing required erasure cycles. Again, it should be noted that while FIG. 5 is described with respect to augmenting a conventional LFU cache replacement algorithm to further consider data access types (e.g., sequential vs. random access), various other types of cache replacement algorithms (e.g., FIFO, LRU, etc.) may be similarly modified to consider data access types. Further, a cache replacement algorithm may take into account data access types and multiple other parameters or criteria (e.g., both access frequency for LFU and access recency for LRU).

FIG. 6 shows a table 600 illustrating an example where there is a total of 10 cache pages, numbered 0 through 9. The table 600 illustrates the access count or frequency (C), random-access count (D), access frequency ratio ($R_{Ci}$), ratio of random data access ($R_{ri}$) and comprehensive score (s) for each of the cache pages 0 through 9. As per an LFU cache replacement algorithm, cache pages 7 and 8 are candidates to be replaced, as the access count for cache pages 7 and 8 is the lowest (e.g., 2) among the cache pages 0 through 9. Additional cache replacement algorithms (e.g., FIFO, LRU, etc.) may be used to select which page's data (e.g., cache page 7 or 8) are candidates to be de-staged from the cache and/or for selecting amongst such candidates. In illustrative embodiments, access type is used in addition to or in place of such cache replacement algorithms to select which cache page's data (e.g., cache page 7 or 8) should be de-staged from the cache. After combining the random-access frequency of each of the cache pages with their associated access frequency to produce the comprehensive scores, it is determined that cache page 7 (which has less random-access than cache page 8) is more suitable to be de-staged from the cache and provides more cost savings to flush to a backend disk.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing cache replacement in a storage cache based on input-output access types of data stored in the storage cache will now be described in greater detail with reference to FIGS. 7 and 8. Although described in the context of system 100, these platforms may also be used to implement at least portions of other information processing systems in other embodiments.

Figure 7:
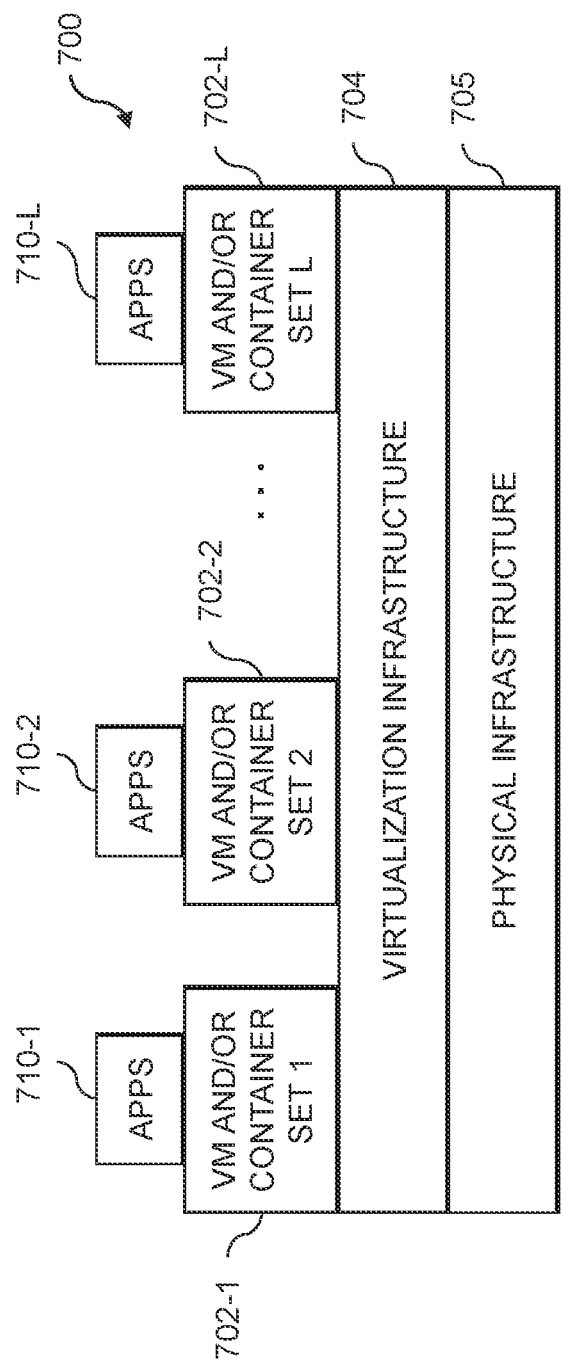
FIGS. 7 and 8 show examples of processing platforms that may be utilized to implement at least a portion of an information processing system in illustrative embodiments.
Figure 8:
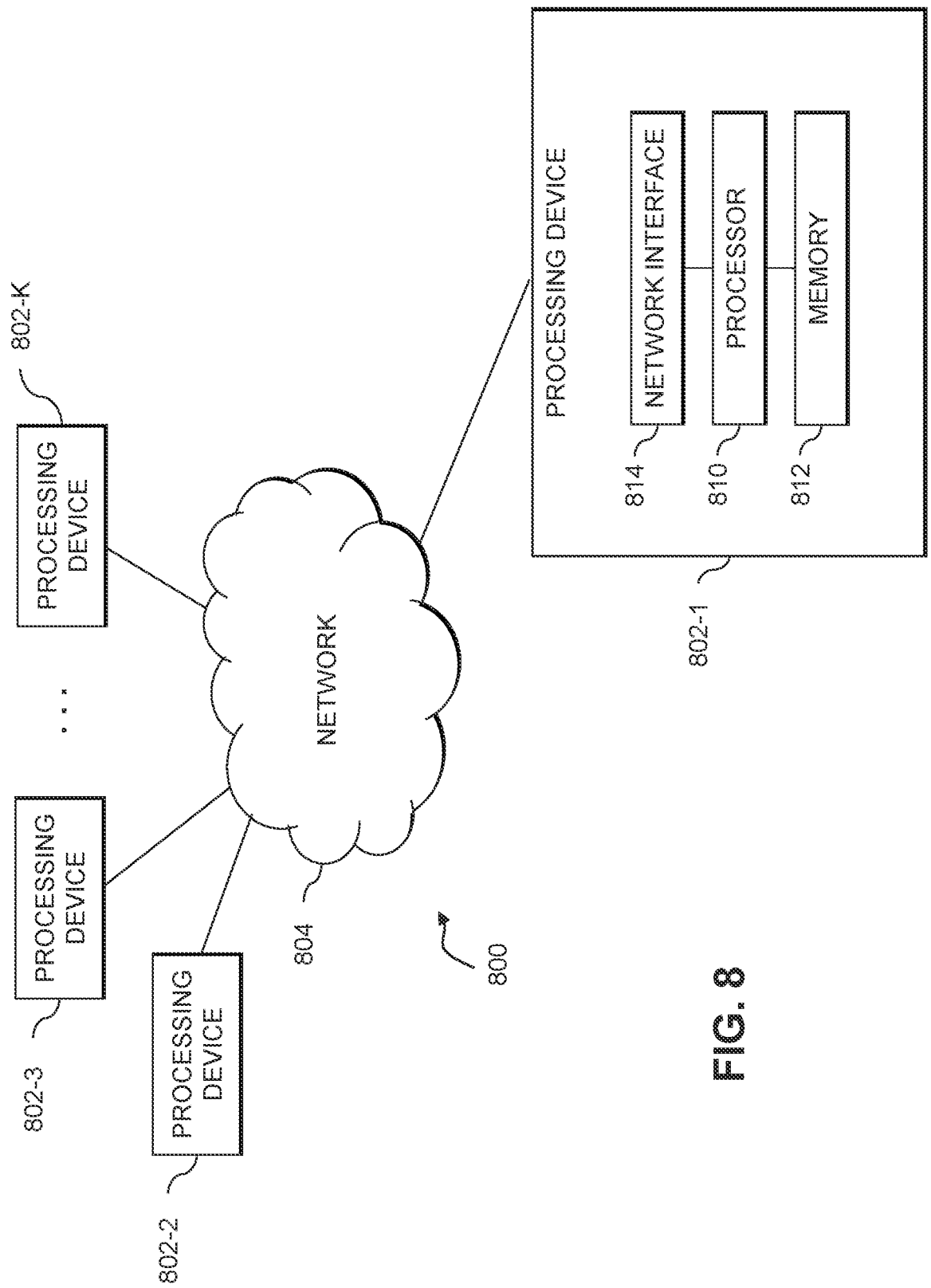

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing cache replacement in a storage cache based on input-output access types of data stored in the storage cache as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage caches, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;

the at least one processing device being configured to perform steps of:

monitoring a storage cache storing a plurality of cache pages to determine whether the storage cache reaches one or more designated conditions;

determining cache replacement scores for at least a subset of the plurality of cache pages, the cache replacement scores being determined based at least in part on input-output access types for data stored in the plurality of cache pages, wherein a given cache replacement score for a given cache page characterizes an amount of data, of a given input-output access type, stored in the given cache page;

selecting, responsive to determining that the storage cache has reached at least one of the one or more designated conditions, at least one of the plurality of cache pages to move from the storage cache to a storage device based at least in part on the determined cache replacement scores; and moving the selected at least one of the plurality of cache pages from the storage cache to the storage device.

2. The apparatus of claim 1 wherein the one or more designated conditions comprise reaching a cache full condition.

3. The apparatus of claim 1 wherein the one or more designated conditions comprise storage space in the storage cache falling below a designated space threshold.

4. The apparatus of claim 1 wherein determining the given cache replacement score for the given cache page comprises determining a ratio of an amount of random input-output data stored in the given cache page relative to total random input-output data stored in the plurality of cache pages.

5. The apparatus of claim 1 wherein the given cache replacement score for the given cache page comprises a weighted combination of a first component score determined based at least in part on the input-output access types for data stored in the given cache page and one or more additional component scores determined based at least in part on one or more additional criteria.

6. The apparatus of claim 5 wherein the one or more additional criteria comprise at least one of an access frequency of the given cache page, a most recent access time for the given cache page, and a time at which the given cache page was first stored in the storage cache.

7. The apparatus of claim 5 further comprising adjusting a first weight for the first component score relative to one or more additional weights for the one or more additional criteria.

8. The apparatus of claim 7 wherein adjusting the first weight for the first component score relative to the one or more additional weights for the one or more additional criteria is based at least in part on monitoring a status of the storage device.

9. The apparatus of claim 8 wherein monitoring the status of the storage device comprises monitoring an expected remaining lifetime of the storage device.

10. The apparatus of claim 9 wherein the storage device comprises a solid state drive, and wherein monitoring the expected remaining lifetime of the storage device comprises monitoring a number of erasure cycles performed on the solid state drive.

11. The apparatus of claim 9 wherein adjusting the first weight for the first component score relative to the one or more additional weights for the one or more additional criteria comprises increasing the first weight relative to the one or more additional weights responsive to determining that the expected remaining lifetime of the storage device is below a designated lifetime threshold.

12. The apparatus of claim 1 wherein the input-output access types for the data stored in the plurality of cache pages comprise sequential input-output and random input-output.

13. The apparatus of claim 12 wherein selecting at least one of the plurality of cache pages to move from the storage cache to a storage device based at least in part on the determined cache replacement scores comprises selecting a first one of the plurality of cache pages having a given cache replacement score indicating a lower amount of random input-output data stored therein relative to one or more other ones of the plurality of cache pages.

14. The apparatus of claim 12 wherein selecting at least one of the plurality of cache pages to move from the storage cache to a storage device based at least in part on the determined cache replacement scores comprises selecting, from among at least two of the plurality of cache pages having a same access frequency, a first one of the at least two cache pages having a given cache replacement score indicating a lower amount of random input-output data stored therein relative to one or more other ones of the at least two cache pages.

15. A computer program product comprising a non-transitory processor-readable storage medium having stored therein program code of one or more software programs, wherein the program code when executed by at least one processing device causes the at least one processing device to perform steps of:

monitoring a storage cache storing a plurality of cache pages to determine whether the storage cache reaches one or more designated conditions;

determining cache replacement scores for at least a subset of the plurality of cache pages, the cache replacement scores being determined based at least in part on input-output access types for data stored in the plurality of cache pages, wherein a given cache replacement score for a given cache page characterizes an amount of data, of a given input-output access type, stored in the given cache page;

selecting, responsive to determining that the storage cache has reached at least one of the one or more designated conditions, at least one of the plurality of cache pages to move from the storage cache to a storage device based at least in part on the determined cache replacement scores; and moving the selected at least one of the plurality of cache pages from the storage cache to the storage device.

16. The computer program product of claim 15 wherein determining the given cache replacement score for the given cache page comprises a weighted combination of a first component score determined based at least in part on the input-output access types for data stored in the given cache page and one or more additional component scores determined based at least in part on one or more additional criteria, the one or more additional criteria comprise at least one of an access frequency of the given cache page, a most recent access time for the given cache page, and a time at which the given cache page was first stored in the storage cache.

17. The computer program product of claim 15 wherein the input-output access types for the data stored in the plurality of cache pages comprise sequential input-output and random input-output, and wherein selecting at least one of the plurality of cache pages to move from the storage cache to a storage device based at least in part on the determined cache replacement scores comprises selecting a first one of the plurality of cache pages having a given cache replacement score indicating a lower amount of random input-output access data stored therein relative to one or more other ones of the plurality of cache pages.

18. A method comprising:

monitoring a storage cache storing a plurality of cache pages to determine whether the storage cache reaches one or more designated conditions;

determining cache replacement scores for at least a subset of the plurality of cache pages, the cache replacement scores being determined based at least in part on input-output access types for data stored in the plurality of cache pages, wherein a given cache replacement score for a given cache page characterizes an amount of data, of a given input-output access type, stored in the given cache page;

selecting, responsive to determining that the storage cache has reached at least one of the one or more designated conditions, at least one of the plurality of cache pages to move from the storage cache to a storage device based at least in part on the determined cache replacement scores; and moving the selected at least one of the plurality of cache pages from the storage cache to the storage device;

wherein the method is performed by at least one processing device comprising a processor coupled to a memory.

19. The method of claim 18 wherein determining the given cache replacement score for the given cache page comprises a weighted combination of a first component score determined based at least in part on the input-output access types for data stored in the given cache page and one or more additional component scores determined based at least in part on one or more additional criteria, the one or more additional criteria comprise at least one of an access frequency of the given cache page, a most recent access time for the given cache page, and a time at which the given cache page was first stored in the storage cache.

20. The method of claim 18 wherein the input-output access types for the data stored in the plurality of cache pages comprise sequential input-output access and random input-output access, and wherein selecting at least one of the plurality of cache pages to move from the storage cache to a storage device based at least in part on the determined cache replacement scores comprises selecting a first one of the plurality of cache pages having a given cache replacement score indicating a lower amount of random input-output data stored therein relative to one or more other ones of the plurality of cache pages.

* * * * *